(12) United States Patent
Zhang et al.

(10) Patent No.: US 12,068,945 B2
(45) Date of Patent: Aug. 20, 2024

(54) REROUTING METHOD AND APPARATUS ACHIEVING FAST REROUTING FOR AFFECTED SERVICE IN SLICED NETWORK, ELECTRONIC DEVICE, AND COMPUTER READABLE MEDIUM

(71) Applicant: ZTE Corporation, Shenzhen (CN)

(72) Inventors: Tianxiang Zhang, Shenzhen (CN); Qianchun Lu, Shenzhen (CN); Jin Qi, Shenzhen (CN); Feng Li, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 9 days.

(21) Appl. No.: 17/920,500

(22) PCT Filed: Nov. 20, 2020

(86) PCT No.: PCT/CN2020/130650
§ 371 (c)(1),
(2) Date: Oct. 21, 2022

(87) PCT Pub. No.: WO2021/212823
PCT Pub. Date: Oct. 28, 2021

(65) Prior Publication Data
US 2023/0155920 A1    May 18, 2023

(30) Foreign Application Priority Data
Apr. 23, 2020    (CN) .......................... 202010328422.7

(51) Int. Cl.
*H04L 41/16*    (2022.01)
*H04L 45/00*    (2022.01)
*H04L 45/02*    (2022.01)
*H04L 45/12*    (2022.01)

(52) U.S. Cl.
CPC ............ *H04L 45/123* (2013.01); *H04L 41/16* (2013.01); *H04L 45/02* (2013.01); *H04L 45/22* (2013.01)

(58) Field of Classification Search
CPC ....... H04L 45/123; H04L 41/16; H04L 45/02; H04L 45/22; H04L 41/122; H04L 45/28; H04L 45/08
See application file for complete search history.

(56) References Cited

U.S. PATENT DOCUMENTS

2018/0123878 A1* 5/2018 Li ........................... H04L 41/40
2018/0278466 A1* 9/2018 McCormick ........ H04L 41/0896
(Continued)

FOREIGN PATENT DOCUMENTS

CN    101286892 A    10/2008
CN    102223310 A    10/2011
(Continued)

OTHER PUBLICATIONS

International Search Report for corresponding application PCT/CN2020/130650 filed Nov. 20, 2020; Mail date Feb. 18, 2021.

*Primary Examiner* — Johnny B Aguiar
(74) *Attorney, Agent, or Firm* — CANTOR COLBURN LLP

(57) ABSTRACT

Provided is a rerouting method. The method includes: updating network slice information based on service information of an affected service, wherein the service information includes service bandwidth resources, and the network slice information is information of one or more network slices obtained by dividing a topology of an original network; obtaining a network slice index of the affected service based on the service information of the affected service and the updated network slice information, wherein the network slice index is a correspondence between the affected service and the network slice; and determining a new route for the
(Continued)

affected service based on the affected service and the network slice index. The rerouting method has the advantages of short time consumption, high efficiency and high success rate when performing rerouting. A rerouting apparatus, an electronic device, and a computer readable medium are also provided.

18 Claims, 6 Drawing Sheets

(56) References Cited

U.S. PATENT DOCUMENTS

| | | | |
|---|---|---|---|
| 2019/0150158 A1* | 5/2019 | Farmanbar | H04W 24/08 |
| | | | 370/329 |
| 2019/0394132 A1 | 12/2019 | Zhang | |
| 2020/0044943 A1* | 2/2020 | Bor-Yaliniz | H04L 41/5009 |
| 2020/0137621 A1* | 4/2020 | Yang | H04W 28/0289 |
| 2020/0186411 A1* | 6/2020 | Ravichandran | H04L 41/0659 |
| 2021/0160131 A1* | 5/2021 | Maguire | H04L 41/0806 |
| 2021/0321325 A1* | 10/2021 | Srivastava | H04L 41/0893 |

FOREIGN PATENT DOCUMENTS

| | | |
|---|---|---|
| CN | 104980351 A | 10/2015 |
| CN | 105721192 A | 6/2016 |
| CN | 108075982 A | 12/2017 |
| CN | 109429277 A | 3/2019 |
| CN | 109768924 A | 5/2019 |
| CN | 110167094 A | 8/2019 |
| WO | 2016165422 A1 | 1/2016 |

\* cited by examiner

REROUTING METHOD AND APPARATUS ACHIEVING FAST REROUTING FOR AFFECTED SERVICE IN SLICED NETWORK, ELECTRONIC DEVICE, AND COMPUTER READABLE MEDIUM

CROSS REFERENCE

This application is a National Stage Filing of the PCT International Application No. PCT/CN2020/130650 filed on Nov. 20, 2020, which claims priority to Chinese Patent Application No. 202010328422.7 filed on Apr. 23, 2020, the entirety of which is herein incorporated by reference.

TECHNICAL FIELD

Embodiments of the present disclosure relate to the field of Internet technologies, and in particular, to a rerouting method and apparatus, an electronic device, and a computer readable medium.

BACKGROUND

Rerouting is a service recovery method. When a Label Switch Path (LSP) on a service path is interrupted, a controller (or a head node) needs to re-plan a route, i.e., calculating an optimal path for recovering the service and establishing a new LSP through signaling, so that the service is transmitted by the new LSP.

In a Software Defined Network (SDN) scenario, the controller may collect global topology information. When network flapping occurs, for example, when a link or node fails, affected services need to be recovered quickly in order not to affect user experience. Since the affected services have a bandwidth constraint and are limited by network bandwidth resources, rerouting of a batch of services by a controller consumes a long time and has a low success rate, which reduces user experience.

SUMMARY

Embodiments of the present disclosure provide a rerouting method and apparatus, an electronic device, and a computer readable medium, which may reduce rerouting time, improve rerouting success rate, and improve user experience.

According to a first aspect, an embodiment of the present disclosure provides a rerouting method, including: updating network slice information based on service information of an affected service, wherein the service information includes service bandwidth resources, and the network slice information is information of one or more network slices obtained by dividing a topology of an original network; obtaining a network slice index of the affected service based on the service information of the affected service and the updated network slice information, wherein the network slice index is a correspondence between the affected service and the network slice; and determining a new route for the affected service based on the affected service and the network slice index.

According to a second aspect, an embodiment of the present disclosure provides a rerouting apparatus, including: an updating module, configured to update network slice information based on service information of an affected service, wherein the service information includes service bandwidth resources, and the network slice information is information of one or more network slices obtained by dividing a topology of an original network; a network slice index obtaining module, configured to obtain a network slice index of the affected service based on the service information of the affected service and the updated network slice information, wherein the network slice index is a correspondence between the affected service and a network slice to which the affected service is reassigned; and a route generating module, configured to determine a new route for the affected service based on the affected service and the network slice index.

According to a third aspect, an embodiment of the present disclosure provides an electronic device, including: one or more processors; one or more storage devices, on which one or more programs are stored, wherein when the one or more programs are executed by the one or more processors, the one or more processors implement any of the above method embodiments; and one or more Input/Output (I/O) interfaces, connected between the one or more processors and the one or more storage devices, and configured to implement information interaction between the one or more processors and the one or more storage devices.

According to a fourth aspect, an embodiment of the present disclosure provides a computer readable medium, on which a computer program is stored, and when the computer program is executed by a processor, the foregoing rerouting method is implemented.

BRIEF DESCRIPTION OF THE DRAWINGS

The accompanying drawings are used to provide a further understanding of the embodiments of the present disclosure, constitute a part of the specification, and are used to explain the present disclosure together with the embodiments of the present disclosure, but do not constitute a limitation to the present disclosure. The above and other features and advantages will become more apparent to those having ordinary skill in the art based on the detailed description on the exemplary embodiments with reference to the accompanying drawings. In the drawings.

DETAILED DESCRIPTION

To make those having ordinary skill in the art better understand the technical solutions of the present disclosure, a rerouting method and apparatus, an electronic device, and a computer readable medium provided in the present disclosure are described in detail with reference to the accompanying drawings.

Exemplary embodiments will be described more fully hereinafter with reference to the accompanying drawings, but may be embodied in various forms and should not be construed as limited to the embodiments set forth herein. Rather, these embodiments are provided so that the present disclosure will be thorough and complete, and will fully convey the scope of the present disclosure to those having ordinary skill in the art.

The embodiments of the present disclosure and the features in the embodiments may be combined with each other without conflict.

As used herein, the term "and/or" includes any and all combinations of one or more of the associated listed items.

The terminology used herein is for the purpose of describing exemplary embodiments only and is not intended to be limiting of the disclosure. As used herein, the singular forms "a", "an" and "the" are intended to include the plural forms as well, unless the context clearly indicates otherwise. It will be further understood that the terms "includes" and/or "made of", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by those having ordinary skill in the art. It will also be understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In an SDN, a controller can obtain global topology information through forwarding devices. According to the embodiments of the present disclosure, fast service recovery in a fiber break scenario is implemented in a case where the global topology information is collected in the SDN.

Figure 1:
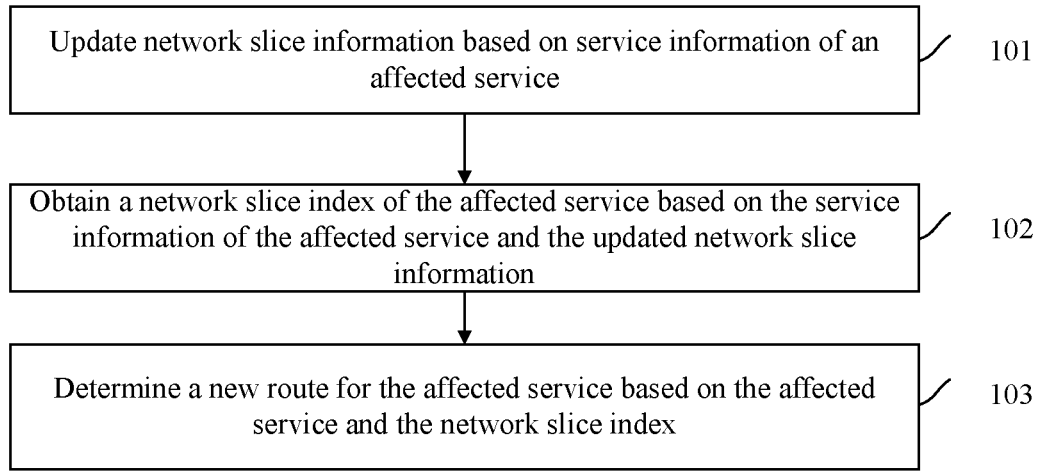
FIG. 1 is a flowchart of a rerouting method according to an embodiment of the present disclosure.

According to a first aspect, an embodiment of the present disclosure provides a rerouting method. FIG. 1 is a flowchart of a rerouting method according to an embodiment of the present disclosure. Referring to FIG. 1, the rerouting method includes operations 101 to 103.

At 101, network slice information is updated based on service information of an affected service.

In operation 101, when network flapping occurs, for example, when a link or node fails, services related to the link or node are affected, and therefore service information of the affected services may be determined according to the failed link or node. The service information of the affected service at least includes bandwidth resources, and may further include information such as a source node, a sink node, quality of service, a current deployment path, and/or a constraint condition.

The network slice information is information of one or more network slices obtained by dividing a topology of an original network.

In this embodiment, the topology of the original network refers to topology information reported to the controller by forwarding devices according to a protocol when the controller is started or restarted for the first time. The topology information includes attributes such as a node, a link bandwidth, a link delay and/or a link weight. It is not difficult to understand that the topology information is the topology information of the whole SDN, including both the network information that is being used and the network information that is not being used.

The original network is divided according to bandwidth resources of the original network. In some embodiments, the original network is divided in multiple manners, for example, the original network may be divided based on a bandwidth averaging criterion or a bandwidth randomization criterion, so as to obtain multiple network slices.

Figure 2:
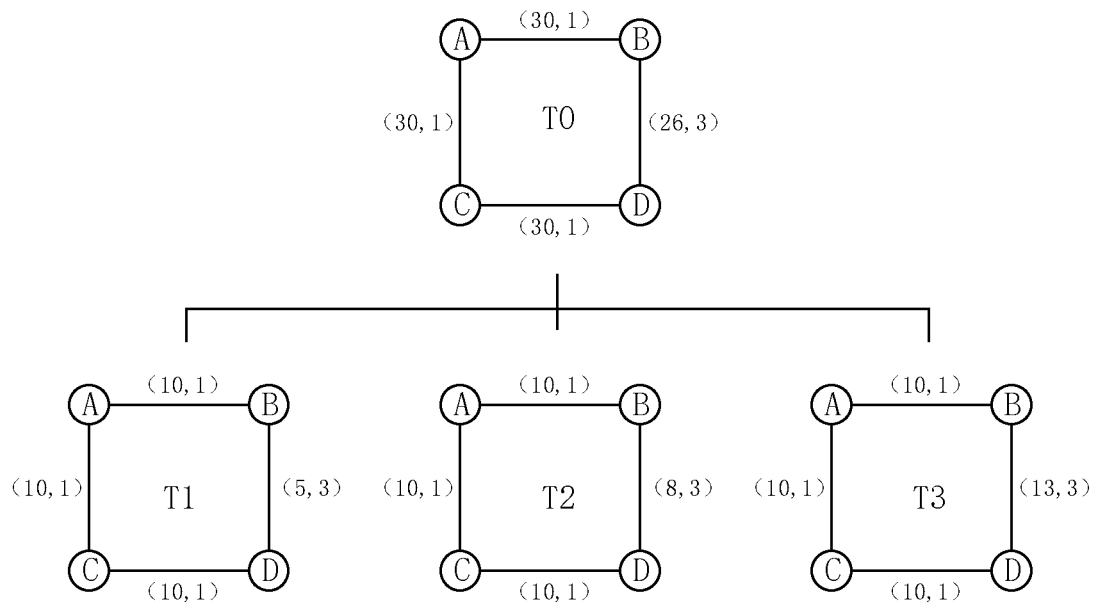
FIG. 2 is a topology graph of an original network and topology graphs of divided network slices according to an embodiment of the present disclosure.

FIG. 2 is a topology graph of an original network and topology graphs of divided network slices according to an embodiment of the present disclosure. As shown in FIG. 2, the topology T0 of the original network includes four nodes A, B, C and D and four links A-B, B-D, D-C and C-A, wherein the amount of the remaining bandwidth resources on the link A-B is 30, and the weight of the link A-B is 1; the amount of the remaining bandwidth resources on the link B-D is 26, and the weight of the link B-D is 3; the amount of the remaining bandwidth resources on the link D-C is 30, and the weight of the link D-C is 1; and the amount of the remaining bandwidth resources on the link C-A is 30, and the weight of the link C-A is 1.

The topology T0 of the original network is divided into network slices T1, T2 and T3, and the topologies of the network slices T1, T2 and T3 are consistent with the topology T0 of the original network. That is, the network slices T1, T2 and T3 each include four nodes A, B, C and D and four links A-B, B-D, D-C, and C-A.

In the network slice T1, the amount of the remaining bandwidth resources on the link A-B is 10, and the weight of the link A-B is 1; the amount of the remaining bandwidth resources on the link B-D is 5, and the weight of the link B-D is 3; the amount of the remaining bandwidth resources on the link D-C is 10, and the weight of the link D-C is 1; and the amount of the remaining bandwidth resources on the link C-A is 10, and the weight of the link C-A is 1.

In the network slice T2, the amount of the remaining bandwidth resources on the link A-B is 10, and the weight of the link A-B is 1; the amount of the remaining bandwidth resources on the B-D link is 8, and the weight of the link B-D is 3; the amount of the remaining bandwidth resources on the link D-C is 10, and the weight of the link D-C is 1; and the amount of the remaining bandwidth resources on the link C-A is 10, and the weight of the link C-A is 1.

In the network slice T3, the amount of the remaining bandwidth resources on the link A-B is 10, and the weight of the link A-B is 1; the amount of the remaining bandwidth resources on the link B-D is 13, and the weight of the link B-D is 3; the amount of the remaining bandwidth resources on the link D-C is 10, and the weight of the link D-C is 1; and the amount of the remaining bandwidth resources on the link C-A is 10, and the weight of the link C-A is 1.

In some embodiments, the topology T0 of the original network is divided into the network slices T1, T2 and T3, and the topologies of the network slices T1, T2 and T3 are consistent or inconsistent with the topology T0 of the original network. For example, the amount of the bandwidth resources on the link C-A in the network slice T1 is 0, then the topology of the network slice T1 includes four nodes A, B, C and D and three links A-B, B-D, and D-C. The topologies of the network slices T2 and T3 are consistent with the topology T0 of the original network.

It can be easily understood that, for a certain link in respective network slices, the sum of the amounts of bandwidth resources corresponding to the respective network slices is equal to the amount of bandwidth resources on this link in the topology T0 of the original network. In addition, the bandwidth resources of respective network slices are isolated from each other.

When a link or node in the original network fails, for example, when a certain link is disconnected, one or more services related to the link will be affected. Before recovering the one or more affected services, resources occupied by the one or more affected services need to be determined, so as to release the resources occupied by the one or more affected services, thereby providing a basis for re-planning the routes for the one or more affected services.

In some embodiments, after the service information of the affected service is obtained, the affected service is determined, the path of the affected service is determined, and the bandwidth resources of the affected service are released. At the same time, the network slice information is updated, that is, links and nodes corresponding to the affected service are deleted, and the link resources are restored.

Figure 3:
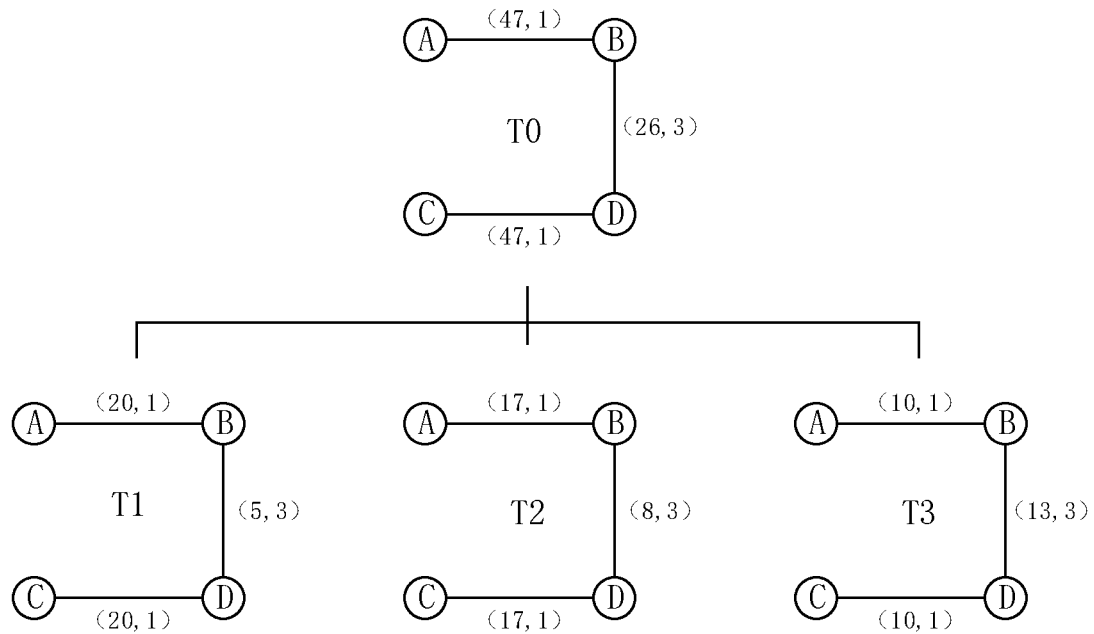
FIG. 3 is a topology graph of an original network and topology graphs of divided network slices in a scenario of fiber break according to an embodiment of the present disclosure.

FIG. 3 is a topology graph of an original network and topology graphs of divided network slices in a scenario of fiber break according to an embodiment of the present disclosure. As shown in FIG. 3, assuming that fiber break occurs in link A→C, at this time, fiber break occurs in link A→C in all of the three network slices T1, T2 and T3, and the topologies of the three network slices T1, T2 and T3 change accordingly. The bandwidth resources on the link A→C are assigned to the link B→A, the link C→D and the link D→B. For example, when the amount of the bandwidth resources on the link A→C is 30, the amounts of the bandwidth resources on the link B→A, the link C→D and the link D→B will be increased by values a sum of which is equal to 30. The amounts of the remaining bandwidths on the link B→A and the link C→D are respectively increased by 10 and 7 in the network slice T1 and the network slice T2, that is, for the link B→A and the link C→D in the network slice T1, the amounts of the bandwidth resources before the fiber break are both 10, and the amounts of the bandwidth resources after the fiber break are both 20; and for the link B→A and the link C→D in the network slice T2, the amounts of the bandwidth resources before the fiber break are both 10, and the amounts of the bandwidth resources after the fiber break are both 17.

Specifically, in the network slice T1, the amount of the remaining bandwidth resources on the link A-B is 20, and the weight of the link A-B is 1; the amount of the remaining bandwidth resources on the link B-D is 5, and the weight of the link B-D is 3; and the amount of the remaining bandwidth resources on the link D-C is 20, and the weight of the link D-C is 1.

In the network slice T2, the amount of the remaining bandwidth resources on the link A-B is 17, and the weight of the link A-B is 1; the amount of the remaining bandwidth resources on the B-D link is 8, and the weight of the link B-D is 3; and the amount of the remaining bandwidth resources on the link D-C is 17, and the weight of the link D-C is 1.

In the network slice T3, the amount of the remaining bandwidth resources on the link A-B is 10, and the weight of the link A-B is 1; the amount of the remaining bandwidth resources on the link B-D is 13, and the weight of the link B-D is 3; and the amount of the remaining bandwidth resources on the link D-C is 10, and the weight of the link D-C is 1.

In this embodiment, the network slice information is updated based on the service information of the affected service, for example, the link A→C is deleted, and the bandwidth resources on the link B→A and the link C→D are changed.

It should be noted that, although in the embodiment the topology T0 of the original network is divided into three network slices T1, T2 and T3, it does not mean that the number of the network slices is limited to 3. In fact, the number of the network slices may be set arbitrarily according to the complexity degree of the topology T0 of the original network or according to other factors. The number of the network slices is not limited in this embodiment.

At 102, a network slice index of the affected service is obtained based on the service information of the affected service and the updated network slice information.

In operation 102, after the affected service is determined, the route of the affected service is re-planned. In order to enable multiple affected services to quickly obtain new routes, in this embodiment, the network slice indexes of the affected services are obtained based on the service information of the affected services and the updated network slice information, and then the routes are re-planned based on the network slice indexes. The network slice index is a correspondence between an affected service and a network slice to which the service is reassigned.

In this embodiment, the network slice index refers to an index, obtained from the updated network slice information, of the affected service, that is, an index for indicating a network slice to which the affected service is reassigned.

With reference to FIG. 2, FIG. 3 and Table 1, for example, six services currently exist, wherein service 1 is from the node B to the node D, occupies 10 bandwidth resources, is currently assigned to the network slice T1, and the path is B→D; service 2 is from the node B to the node D, occupies 10 bandwidth resources, is currently assigned to the network slice T1, and the path is B→A→C→D; service 3 is from the node B to the node D, occupies 7 bandwidth resources, is currently assigned to the network slice T2, and the path is B→D; service 4 is from the node B to the node D, occupies 7 bandwidth resources, is currently assigned to the network slice T2, and the path is B→A→C→D; service 5 is from the node B to the node D, occupies 1 bandwidth resource, is currently assigned to the network slice T3, and the path is B→D; and service 6 is from the node B to the node D, occupies 1 bandwidth resource, is currently assigned to the network slice T3, and the path is B→D. In this case, the remaining bandwidth information in the network slice is as shown in FIG. 2.

Table 1 is service information of six services in the embodiment of the present disclosure

TABLE 1

| Service number | Source node | Sink node | Bandwidth | Original slice network of the service | Slice network of the service after the fiber break |
|---|---|---|---|---|---|
| 1 | B | D | 10 | Network slice T1 | Network slice T1 |
| 2 | B | D | 10 | Network slice T1 | Network slice T3 |
| 3 | B | D | 7 | Network slice T2 | Network slice T2 |
| 4 | B | D | 7 | Network slice T2 | Network slice T2 |
| 5 | B | D | 1 | Network slice T3 | Network slice T3 |
| 6 | B | D | 1 | network slice T3 | network slice T3 |

Assuming that a fiber break occurs in the link A→C, that is, a fiber break occurs in the physical topology of the original network, then the topologies in the three network slices also change accordingly. Service 2 and service 4 passing the link A→C are affected services. Therefore, when updating the network slice information, the link A→C in the network slices T1, T2 and T3 is deleted, and the amounts of the remaining bandwidths on the link B→A and the link C→D in the network slice T1 and the network slice T2 are increased by 10 and 7 correspondingly. FIG. 3 is topology graphs of network slices after the network slice information is updated. The network slice index of the affected service is obtained based on the updated network slice information. For example, service 2 needs 10 bandwidth resources, and service 4 needs 7 bandwidth resources, therefore the link B→D, on which the amount of bandwidth resources is 5, in the network slice T1 cannot satisfy the requirements of service 2 and service 4, and thus a new service cannot be assigned to the network slice T1. The amount of the bandwidth resources on the link B→D in the network slice T2 is 8, and the amount of the service resources on the link B→D in the network slice T3 is 13, the amount of the bandwidth resources in the network slice T2 can only satisfy service 4, and the amount of the bandwidth resources in the network slice T3 can satisfy both service 4 and service 2. However, only when service 2 is assigned to the network slice T3 and service 4 is assigned to the network slice T2, service 2 and service 4 can be recovered at the same time, therefore service 2 is assigned to the network slice T3 and service 4 is assigned to the network slice T2.

At 103, a new route is determined for the affected service based on the affected service and the network slice index.

In operation 103, path calculation is performed for the newly assigned services simultaneously in the network slice T1, the network slice T2 and the network slice T3 to obtain a new route B→D for service 2 and a new route B→D for service 4. So far, the controller completes the rerouting of service 2 and service 4. It is easy to be understood that, when a new route is calculated, the network slice T1 does not participate in the calculation, because a service to be recovered is not assigned to the network slice T1.

Figure 4:
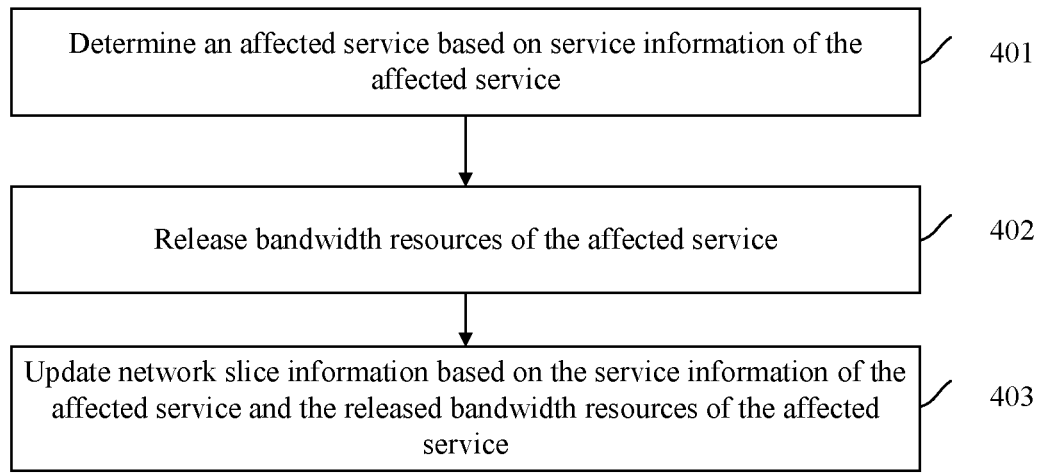
FIG. 4 is a flowchart of updating network slice information based on service information of an affected service in a rerouting method according to an embodiment of the present disclosure.

FIG. 4 is a flowchart of updating network slice information based on service information of an affected service in a rerouting method according to an embodiment of the present disclosure. As shown in FIG. 4, updating the network slice information based on the service information of the affected service includes operations 401 to 403.

At 401, the affected service is determined based on the service information of the affected service.

In the operation 401, after obtaining the service information of the affected service, the source node, the sink node and the amount of bandwidth resources of the affected service can be acquired. The affected service is determined so as to obtain the service information of the affected service.

Referring to Table 1, it is assumed that service 2 is an affected service, then service 2 is determined to obtain the service information of service 2 which includes a source node (node B), a sink node (node D), and bandwidth resources (the amount of which being 10).

At 402, the bandwidth resources of the affected service are released.

In the operation 402, the bandwidth resources of service 2 are released.

At 403, the network slice information is updated based on the service information of the affected service and the released bandwidth resources of the affected service.

In the operation 403, the network slice information is updated based on the service information of the affected service and the released bandwidth resources. For example, the source node B and the sink node D of service 2 are updated, and the bandwidth resources on the link A-B, the link B-D, the link D-C and the link A-C are updated. The released bandwidth resources (the amount of which being 10) on the link B-D are assigned to the link A-B, the link D-C and the link A-C.

In some embodiments, in the operation 103, the network slice index of the affected service is obtained through an AI model. For example, the network slice index of the affected service is obtained by using the AI model based on the service information of the affected service and updated network slice information.

Figure 5:
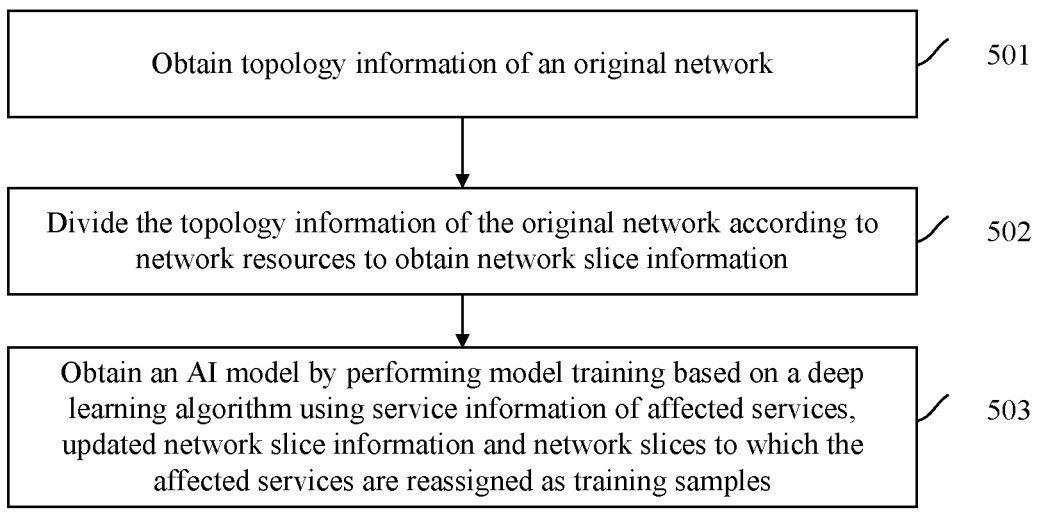
FIG. 5 is a flowchart of obtaining an Artificial Intelligence (AI) model in a rerouting method according to an embodiment of the present disclosure.

FIG. 5 is a flowchart of obtaining an AI model in a rerouting method according to an embodiment of the present disclosure. As shown in FIG. 5, the process for training the AI model includes operations 501 to 503.

At 501, topology information of the original network is obtained.

The topology information of the original network includes nodes, link bandwidth resources, link delays and link weights.

In some embodiments, the topology information of the original network is obtained from forwarding devices connected to the controller. Generally, when the controller is started or restarted for the first time, the forwarding devices report the topology information to the controller according to a forwarding protocol.

At 502, the topology information of the original network is divided according to the network resources to obtain the network slice information.

The network resources may be bandwidth resources or other resources. The topology information of the original network is divided according to the network resources to obtain the network slice information.

In some embodiments, the topology information of the original network is divided according to a bandwidth averaging criterion or a bandwidth randomization criterion, so as to obtain the network slice information. The network slice information includes information of multiple network slices. The information of the network slice includes a topology, a link attribute, and the like.

In some embodiments, the topology of the network slice is identical to the topology of the original network. For a certain link, the sum of the amounts of the bandwidth resources corresponding to respective network slices T1, T2 and T3 is equal to the amount of the bandwidth resources of the link in the topology T0 of the original network. For example, it is assumed that the amounts of the bandwidth resources corresponding to the link B-D in the network slices T1, T2 and T3 are 5, 8, and 13 respectively, and the sum of these amounts of the bandwidth resources is 26, which equals to the amount of the bandwidth resources on the link B-D in the topology T0 of the original network. This is also a characteristic of the network slices.

At 503, the AI model is obtained by performing model training based on a deep learning algorithm using service information of affected services, updated network slice information and network slices to which the affected services are reassigned as training samples.

In the operation 503, a machine learning model is established based on training samples constructed by means of a greedy method and a heuristic method, taking the service information of affected services and the network slice information as input, and taking network slices to which the affected services are reassigned as output. After being trained, the AI model is stored for subsequent invocation.

In some embodiments, a deep learning training model is used to simulate a fiber break phenomenon of a physical network T0, taking the service information of affected services after the fiber break and the network slice information updated after the fiber break as input, and taking network slices to which the affected services are reassigned as output. In this embodiment, the AI model may be trained in an offline manner. With the AI model, the network slice indexes of all affected services can be obtained.

For example, service 4 is an affected service and occupies 7 bandwidth resources, therefore, in the updated network slice information, the remaining bandwidths in the network slice T1 and the network slice T2 are increased by 7 correspondingly, and service 4 is reassigned to the network slice T2, that is, the affected service 4 belongs to the network slice T2.

As another example, as shown in Table 1, service 1 may be reassigned to the network slice T1, and service 2 may be reassigned to the network slice T3.

Figure 6:
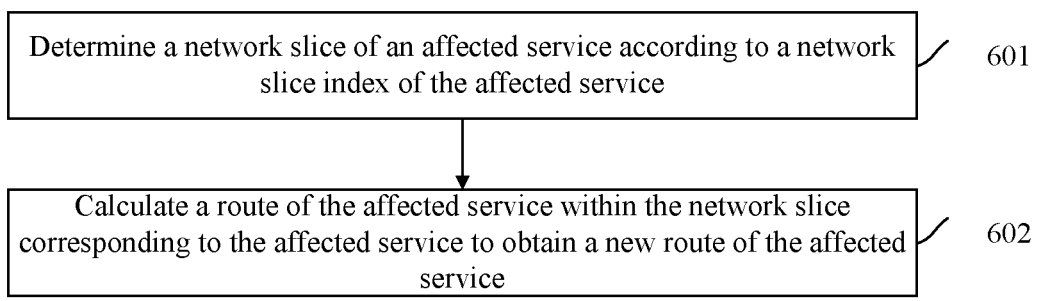
FIG. 6 is a flowchart of determining a new route for the affected service based on the affected service and the network slice index in a rerouting method according to an embodiment of the present disclosure.

FIG. 6 is a flowchart of determining a new route for the affected service based on the affected service and the network slice index in a rerouting method according to an embodiment of the present disclosure. As shown in FIG. 6, the process of obtaining the new route for the affected service based on the affected service and the corresponding network slice index includes operations 601 and 602.

At 601, a network slice of the affected service is determined according to the network slice index of the affected service.

The network slice index of the affected service is obtained by using an AI model according to the service information of the affected service and the updated network slice information, and the network slice of the affected service is determined according to the network slice index.

At 602, a path of the affected service is calculated within the network slice corresponding to the affected service to obtain the new route of the affected service.

In the operation 602, the paths of the affected services are calculated within respective network slices in a parallel manner to obtain the new routes for the affected services. The new route of each affected service is returned to forwarding devices, and the forwarding devices issue the new route in a distributed manner so as to recover the affected service.

According to the rerouting method provided in the embodiments of the present disclosure, service information of an affected service is obtained, and network slice information is updated based on the service information of the affected service, a network slice index of the affected service is obtained based on the service information of the affected service and the updated network slice information, and a new route is determined for the affected service based on the affected service and the network slice index. The method updates the network slice information based on the service information of the affected services, and then obtains the network slice indexes of the affected services according to the service information of the affected services and the updated network slice information, therefore, new routes can be determined for the affected services in batches in a parallel manner, thereby reducing the time for rerouting, and improving the efficiency of rerouting and the success rate of rerouting, which improves the user experience.

In addition, the rerouting method provided in the embodiments of the present disclosure takes the service type and network slice resources into consideration, and updates the network slice information based on the service information of the affected service, so that the transmission success rate and transmission quality of the service can be ensured as far as possible with limited network resources.

In addition, in the rerouting method provided in the embodiments of the present disclosure, an original network is divided according to network resources, network slice indexes of affected services are obtained based on the service information of the affected services and the updated network slice information, in this way, the routes of the affected services can be recalculated in a parallel manner, thereby greatly reducing the time consumption of rerouting, Theoretically, the time consumed by rerouting is directly proportional to the number of network slices.

Figure 7:
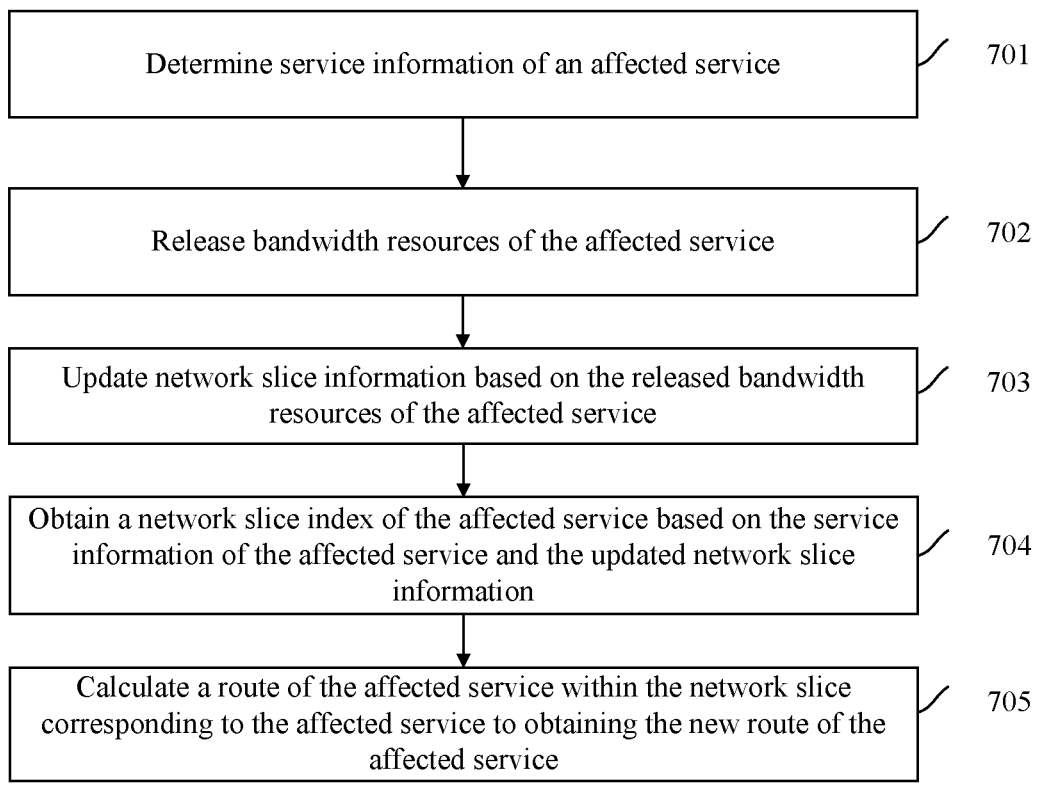
FIG. 7 is a flowchart of a rerouting method according to an embodiment of the present disclosure.

FIG. 7 is a flowchart of a rerouting method according to an embodiment of the present disclosure. In this method, taking the case of network flapping due to node failure as an example, services related to the node are affected, and these affected services need to be rerouted.

As shown in FIG. 7, the rerouting method includes operations 701 to 705.

At 701, service information of an affected service is determined.

In this embodiment, the topology of the original network and the topologies of the network slices are as shown in FIG. 2, and the topologies of the original network and the network slices include four nodes A, B, C and D and four links A-B, B-D, D-C and C-A, in which the amount of the remaining bandwidth resources on the link A-B is 30, and the weight of the link A-B is 1; the amount of the remaining bandwidth resources on the link B-D is 26, and the weight of the link B-D is 3; the amount of the remaining bandwidth resources on the link D-C is 30, and the weight of the link D-C is 1; The amount of the remaining bandwidth resources on the link C-A is 30, and the weight of the link C-A is 1.

It is assumed that network flapping occurs due to failure of the node C, and therefore, services related to the node C are affected and need to be rerouted. For example, the link of service 7 is A→C→D, and when a failure occurs on the node C, service 7 is determined based on the failure of the node 7, and service information of service 7 is obtained, that is, a source node of service 7 is A, a sink node of service 7 is D, and service 7 occupies 15 bandwidth resources.

At 702, bandwidth resources of the affected service are released.

The bandwidth resources of the affected service determined in operation 701 are released. For example, the bandwidth resources of the link A→C and the link C→D are released, and the total amount of the released bandwidth resources is 15.

At 703, network slice information is updated based on the released bandwidth resources of the affected service.

In the operation 703, the released bandwidth resources of the link A→C and the link C→D are assigned to the link A-B and the link B-D, for example, the link A-B obtains 15 bandwidth resources and the link B-D obtains 15 bandwidth resources. The released bandwidth resources are assigned to the network slices T1, T2 and T3, and the network slice information is updated. For example, in the network slice T1, the link A-B obtains 8 bandwidth resources and the link B-D obtains 10 bandwidth resources; in the network slice T2, the link A-B obtains 7 bandwidth resources and the link B-D obtains 5 bandwidth resources; and in the network slice T3, the links A-B and B-D are not assigned with bandwidth resources.

Figure 8:
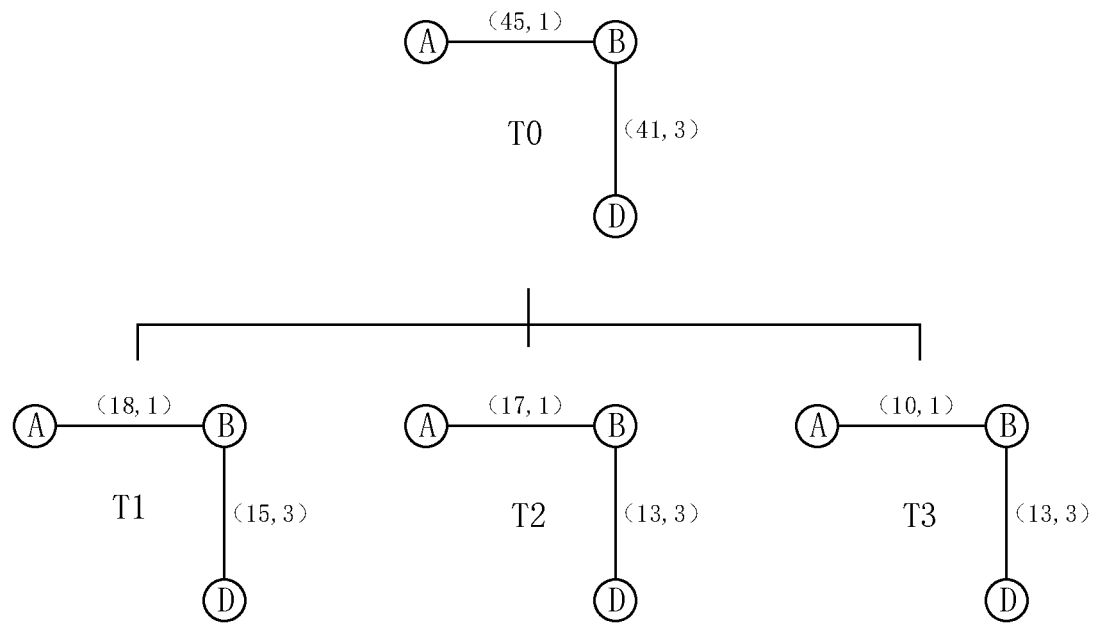
FIG. 8 is a flowchart of obtaining a new route for the affected service based on the affected service and the network slice index in a rerouting method according to an embodiment of the present disclosure.

In this embodiment, as shown in FIG. 8, the updated network slice information is: the topology of each network slice includes three nodes A, B and D and two links A-B and B-D, wherein the amount of the remaining bandwidth resources on the link A-B is 45, and the weight of the link A-B is 1; The amount of the remaining bandwidth resources on the link B-D is 41, and the weight of the link B-D is 3.

In the network slice T1, the amount of the remaining bandwidth resources on the link A-B is 18, and the weight of the link A-B is 1; and the amount of the remaining bandwidth resources on the link B-D are 15, and the weight of the link B-D is 3.

In the network slice T2, the amount of the remaining bandwidth resources on the link A-B is 17, and the weight of the link A-B is 1; and the amount of the remaining bandwidth resources on the link B-D are 13, and the weight of the link B-D is 3.

In the network slice T3, the amount of the remaining bandwidth resources on the link A-B is 10, and the weight of the link A-B is 1; and the amount of the remaining bandwidth resources on the link B-D are 13, and the weight of the link B-D is 3.

At 704, the network slice index of the affected service is obtained based on the service information of the affected service and the updated network slice information.

In the operation 704, the network slice index of the affected service 7 is obtained by using the AI model according to the service information of the affected service 7 and the updated network slice information. For example, the network slice index of service 7 is the network slice T1, i.e., the affected service 7 is reassigned to the network slice T1. In the network slice T2, the amount of the remaining bandwidth resources on the link A-B is 17, and the amount of the remaining bandwidth resources on the link B-D is only 13, while the amount of the bandwidth resources required by service 7 is 15, therefore, the network slice T2 cannot satisfy service 7. In the network slice T3, the amount of the remaining bandwidth resources on the link A-B is 10, and the amount of the remaining bandwidth resources on the link B-D is only 13, therefore the network slice T3 cannot satisfy the bandwidth resources required by service 7. In the network slice T1, the amount of the remaining bandwidth resources on the link A-B is 18, and the amount of the remaining bandwidth resources on the link B-D is 15, therefore the network slice T1 can satisfy the bandwidth resources required by service 7.

It should be noted that, in the embodiments of the present disclosure, the rerouting method is described by taking a failure of a link or a node as an example, but the present disclosure is not limited to the above application scenario. In an actual application, during site maintenance or modification, the rerouting method provided in the embodiments of the present disclosure may also be used to reroute affected services.

At 705, the path of the affected service is calculated within the network slice corresponding to the affected service, so as to obtain the new route of the affected service.

The path of the affected service is calculated within the network slice to obtain a new route for the affected service. The new route of the affected service is returned to forwarding devices, and the forwarding devices issue the new route in a distributed manner so as to recover the affected service.

For example, in this embodiment, the new route of the affected service obtained in the network slice T1 is B→D.

Figure 9:
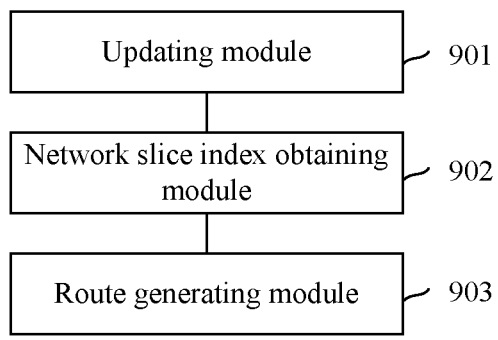
FIG. 9 is a principle block diagram of a rerouting apparatus according to an embodiment of the present disclosure.

In a second aspect, an embodiment of the present disclosure provides a rerouting apparatus. FIG. 9 is a principle block diagram of a rerouting apparatus according to an embodiment of the present disclosure. Referring to FIG. 9, the rerouting apparatus includes: an updating module 901, a network slice index obtaining module and a route generating module.

The updating module 901 is configured to update network slice information based on service information of an affected service.

The network slice information is information of one or more network slices obtained by dividing a topology of an original network.

The service information includes information such as service bandwidth resources, a source node, a sink node, quality of service, a current deployment path, and/or a constraint condition. The service information may be reported to a controller via forwarding devices, and the controller manages a path of a service and resources of a network.

In some embodiments, the updating module 901 includes a topology loading unit and a slice resource management unit. The topology loading unit is configured to obtain node information and link information of an original network, and report the node information and the link information to a controller according to a protocol. The slice resource management unit is configured to perform slice management on the topology of the original network, and divide the topology of the original network into multiple network slices, wherein the topology of each network slice is consistent with the topology of the original network. The slice resource management unit is further configured to maintain the service information corresponding to each network slice.

The updating module 901 is configured to update the network slice information, for example, determine the affected service based on the service information of the affected service, determine nodes and links to be deleted, recover link resource, release bandwidth resources, and then update the network slice information.

The network slice index obtaining module 902 is configured to obtain a network slice index of the affected service based on the service information of the affected service and the updated network slice information.

The network slice index is a correspondence between the affected service and a network slice to which the service is reassigned.

In some embodiments, the network slice index obtaining module 902 may be an AI model, and the service information of the affected service and the updated network slice information are input into the AI model to obtain the network slice index of the affected service.

The route generating module 903 is configured to determine a new route for the affected service based on the affected service and the network slice index.

The route generating module 903 is configured to calculate the paths of the affected services in respective network slices in a parallel manner to obtain new routes of the affected services. The new routes of the affected services are returned to forwarding devices, and the forwarding devices issue the new routes in a distributed manner so as to recover the affected services.

According to the rerouting apparatus provided in this embodiment, service information of an affected service is obtained by using an obtaining module, network slice information is updated based on the service information of the affected service by using an updating module, a network slice index of the affected service is obtained based on the service information of the affected service and the updated network slice information by using the network slice index obtaining module, and a new route is determined for the affected service based on the affected service and the network slice index by using the route generating module. The device reduces the time of rerouting, and improves the efficiency of rerouting and the success rate of rerouting, thereby improving the user experience.

Figure 10:
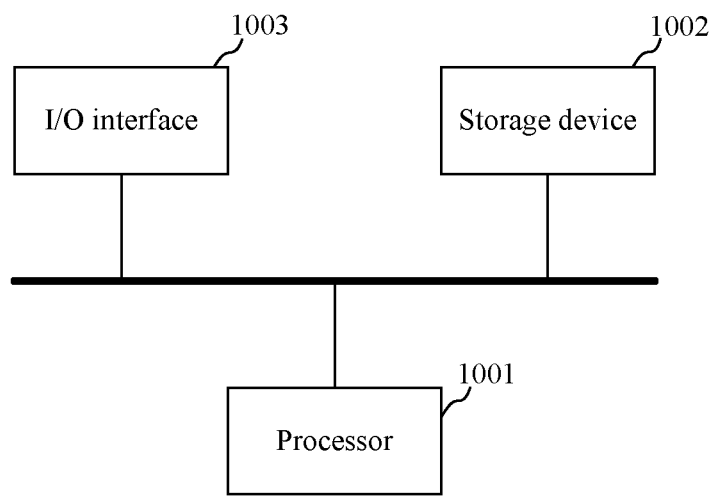
FIG. 10 is a composition block diagram of an electronic device according to an embodiment of the present disclosure.

In a third aspect, referring to FIG. 10, an embodiment of the present disclosure provides an electronic device, including:
one or more processors 1001;
one or more storage devices 1002, on which one or more programs are stored, wherein when the one or more programs are executed by the one or more processors 1001, the one or more processors 1001 implement any one of the foregoing rerouting method; and
one or more I/O interfaces 1003, connected between the one or more processors 1001 and the one or more storage devices 1002, and configured to implement information interaction between the one or more processors 1001 and the one or more storage devices 1002.

The processor 1001 is a device having a data processing capability, and includes, but is not limited to, a central processing unit (CPU), and the like. The storage device 1002 is a device having a data storage capability, and includes, but is not limited to, a random access memory (RAM, more specifically, an SDRAM, a DDR, and the like), a read-only memory (ROM), an electrically erasable programmable read-only memory (EEPROM), and a flash memory (FLASH). The I/O interface (read/write interface) 1003 is connected between the processor 1001 and the storage device 1002, and can implement information interaction between the processor 1001 and the storage device 1002. The I/O interface includes, but is not limited to, a data bus (Bus), and the like.

In some embodiments, the processor 1001, the storage device 1002, and the I/O interface 1003 are interconnected by a bus to which other components of the computing device are connected.

According to a fourth aspect, an embodiment of the present disclosure provides a computer readable medium having a computer program stored thereon, wherein the computer program implements any one of the described rerouting methods when being executed by a processor.

Those having ordinary skill in the art can appreciate that all or some of the operations of the methods disclosed above, the systems, and the functional blocks/units in the apparatuses can be implemented as software, firmware, hardware, and any suitable combination thereof. In a hardware implementation, the division between functional modules/units referred to in the above description does not necessarily correspond to the division of physical components, for example, one physical component may have multiple functions, or one function or operation may be cooperatively performed by several physical components. Some or all of the physical components may be implemented as software executed by a processor, such as a central processor, digital signal processor, or microprocessor, or as hardware, or as an integrated circuit, such as an application specific integrated circuit. Such software may be distributed on computer readable media, which may include computer storage media (or non-transitory media) and communication media (or transitory media). As is well known to those having ordinary skill in the art, the term computer storage media includes both volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical disk storage, magnetic cassettes, magnetic tape, magnetic disk storage or other magnetic storage devices, or any other medium which can be used to store the desired information and which can be accessed by a computer. In addition, communication media typically includes computer readable instructions, data structures, program modules, or other data in a modulated data signal such as a carrier wave or other transport mechanism and may include any information delivery media as is known to those having ordinary skill in the art.

Exemplary embodiments have been disclosed herein, and while specific terms are employed, they are used and should be interpreted in a generic and descriptive sense only and not for purposes of limitation. In some instances, as would be apparent to those having ordinary skill in the art, features, characteristics, and/or elements described in connection with an exemplary embodiment may be used singly or in combination with features, characteristics, and/or elements described in connection with other embodiments unless specifically indicated otherwise. It will thus be understood by those having ordinary skill in the art that various changes in form and details may be made therein without departing from the scope of the disclosure as set forth in the appended claims.

What is claimed is:
1. A rerouting method, comprising:
updating network slice information based on service information of an affected service, wherein the service information comprises service bandwidth resources, and the network slice information is information of one or more network slices obtained by dividing a topology of an original network;

obtaining a network slice index of the affected service by using an Artificial Intelligence (AI) model based on the service information of the affected service and the updated network slice information, wherein the network slice index is a correspondence between the affected service and a network slice, to which the affected service is reassigned, in the one or more network slices, and the AI model is obtained by: obtaining topology information of the original network, wherein the topology information of the original network comprises nodes, link bandwidth resources, link delays and link weights; dividing the topology information of the original network to obtain network slice information, wherein the network slice information comprises information of multiple network slices; and obtaining the AI model by performing model training based on a deep learning algorithm using service information of affected services, updated network slice information and network slices to which the affected services are reassigned as training samples; and determining a new route for the affected service based on the affected service and the network slice index.

2. The method according to claim 1, wherein updating the network slice information based on the service information of the affected service comprises:

releasing bandwidth resources of the affected service; and updating the network slice information based on the released bandwidth resources of the affected service.

3. The method according to claim 2, wherein before updating the network slice information based on the released bandwidth resources of the affected service, the method further comprises:

deleting links and nodes corresponding to the affected service, and restoring the bandwidth resources.

4. The method according to claim 3, wherein in restoring the bandwidth resources, an amount of the bandwidth resources of the affected service is equal to a sum of amounts of bandwidth resources increased on links other than the deleted links.

5. The method according to claim 1, wherein dividing the topology information of the original network to obtain the network slice information comprises:

dividing the topology information of the original network according to a bandwidth averaging criterion or a bandwidth randomization criterion, so as to obtain the network slice information.

6. The method according to claim 1, wherein a topology of each of the one or more network slices is identical to the topology of the original network.

7. The method according to claim 1, wherein determining the new route for the affected service based on the affected service and the network slice index comprises:

determining the network slice, to which the affected service is reassigned, according to the network slice index of the affected service; and calculating a path of the affected service within the network slice to which the affected service is reassigned to obtain the new route of the affected service.

8. The method according to claim 1, wherein the service information of the affected service is determined according to a failed link or node in the original network.

9. The method according to claim 1, wherein for each link in the one or more network slices and the original network, a sum of amounts of bandwidth resources corresponding to the one or more network slices is equal to an amount of bandwidth resources on the link in the topology of the original network.

10. The method according to claim 1, wherein the bandwidth resources of one or more network slices are isolated from each other.

11. The method according to claim 1, wherein a number of the one or more network slices obtained by dividing the topology of the original network is set according to complexity degree of the topology of the original network.

12. The method according to claim 1, wherein the information of each of the one or more network slices comprises a topology and a link attribute of each of the one or more network slices.

13. The method according to claim 1, wherein the AI model is trained in an offline manner.

14. The method according to claim 1, wherein there are multiple affected services, and the method further comprises:

updating the network slice information based on service information of each of the multiple affected services;

obtaining the network slice indexes of the multiple affected services based on the service information of the multiple affected services and the updated network slice information; and determining a new route for each of the multiple affected services based on the multiple affected services and the network slice indexes.

15. The method according to claim 14, wherein determining the new route for each of the multiple affected services based on the multiple affected services and the network slice indexes comprises:

calculating paths of the multiple affected services within respective network slices in a parallel manner to obtain the new routes for the multiple affected services.

16. The method according to claim 1, further comprising:

returning the new route of the affected service to forwarding devices, and issuing, by the forwarding devices, the new route in a distributed manner so as to recover the affected service.

17. An electronic device, comprising:

one or more processors;

one or more storage devices, on which one or more programs are stored, wherein when the one or more programs are executed by the one or more processors, the one or more processors implement the method according to claim 1; and one or more Input/Output (I/O) interfaces, connected between the one or more processors and the one or more storage devices, and configured to implement information interaction between the one or more processors and the one or more storage devices.

18. A non-transitory computer readable medium, on which a computer program is stored, wherein when the computer program is executed by a processor, the method according to claim 1 is implemented.

* * * * *